United States Patent
Komura et al.

(10) Patent No.: US 9,153,267 B1
(45) Date of Patent: Oct. 6, 2015

(54) THERMALLY-ASSISTED MAGNETIC RECORDING HEAD, HEAD GIMBALS ASSEMBLY, HEAD ARM ASSEMBLY AND MAGNETIC RECORDING UNIT

(71) Applicant: TDK CORPORATION, Tokyo (JP)

(72) Inventors: Eiji Komura, Tokyo (JP); Shinji Hara, Tokyo (JP); Norikazu Ota, Tokyo (JP); Tetsuya Roppongi, Tokyo (JP); Kosuke Tanaka, Tokyo (JP)

(73) Assignee: TDK CORPORATION, Tokyo (JP)

( * ) Notice: Subject to any disclaimer, the term of this patent is extended or adjusted under 35 U.S.C. 154(b) by 7 days.

(21) Appl. No.: 14/276,751

(22) Filed: May 13, 2014

(51) Int. Cl.
*G11B 5/39* (2006.01)
*G11B 5/706* (2006.01)
*G11B 13/04* (2006.01)
*G11B 5/00* (2006.01)

(52) U.S. Cl.
CPC .......... *G11B 5/70615* (2013.01); *G11B 13/045* (2013.01); *G11B 2005/0021* (2013.01)

(58) Field of Classification Search
CPC .......................... G11B 5/70615; G11B 13/045
USPC .............................. 360/125.3, 317; 369/13.01
See application file for complete search history.

(56) References Cited

U.S. PATENT DOCUMENTS

| | | | | |
|---|---|---|---|---|
| 6,016,290 | A * | 1/2000 | Chen et al. | 369/13.17 |
| 6,873,576 | B1 * | 3/2005 | Van Kesteren | 369/13.17 |
| 7,330,404 | B2 | 2/2008 | Peng et al. | |
| 8,400,885 | B2 | 3/2013 | Miyauchi et al. | |
| 8,416,646 | B2 * | 4/2013 | Huang et al. | 369/13.01 |
| 8,750,082 | B1 | 6/2014 | Shimazawa et al. | |
| 8,767,348 | B1 | 7/2014 | Tanaka et al. | |
| 2001/0006436 | A1 * | 7/2001 | Akiyama et al. | 360/59 |
| 2001/0017820 | A1 * | 8/2001 | Akiyama et al. | 369/13 |

FOREIGN PATENT DOCUMENTS

JP          B2-4104584          6/2008

OTHER PUBLICATIONS

Pending U.S. Appl. No. 13/746,771, filed Jan. 22, 2013.
Pending U.S. Appl. No. 13/849,784, filed Mar. 25, 2013.

* cited by examiner

*Primary Examiner* — Angel Castro
(74) *Attorney, Agent, or Firm* — Oliff PLC (57) ABSTRACT

A thermally-assisted magnetic recording head of the invention includes: a waveguide; a plasmon generator; and a light-absorbing protrusion layer provided on a leading side of the plasmon generator. A ratio W1/W2 is within a range from 2/3 to 55/3, where W1 is a width of the light-absorbing protrusion layer in an air-bearing surface, and W2 is a width of the waveguide in the air-bearing surface.

8 Claims, 8 Drawing Sheets

THERMALLY-ASSISTED MAGNETIC RECORDING HEAD, HEAD GIMBALS ASSEMBLY, HEAD ARM ASSEMBLY AND MAGNETIC RECORDING UNIT

BACKGROUND OF THE INVENTION

1. Field of the Invention

The invention relates to a thermally-assisted magnetic recording head that uses lowering in coercivity caused by irradiation of near-field light to record information in a magnetic recording medium, and to a head gimbals assembly, a head arm assembly, and a magnetic recording unit that are each provided with the thermally-assisted magnetic recording head.

2. Description of Related Art

In the past, a magnetic recording unit such as a hard disk drive (HDD) has been used for magnetically writing and reading information.

The magnetic disk unit typically includes a magnetic recording medium (a magnetic disk) and a magnetic read write head that performs a write process and a read process of information. The magnetic read write head is formed on one surface of a magnetic head slider, and has a surface (an air-bearing surface) facing the magnetic disk. The magnetic head slider is provided on one end of a suspension, and the other end of the suspension is attached to a pivotable arm.

In recent years, along with a progress in higher recording density (higher capacity) of the magnetic disk, improvement in performance of the magnetic read write head has been demanded. Therefore, as a magnetic recording system capable of dealing with higher recording density, a thermally-assisted magnetic recording system has been studied. In the thermally-assisted magnetic recording system, a magnetic disk in which a magnetic recording layer has large coercivity is used, and heat is applied to a recording region (a region where information is to be recorded) of the magnetic recording layer together with a recording-use magnetic field (recording magnetic field) at the time of writing. Accordingly, the coercivity of the recording region is lowered as well as the recording region is magnetized in response to temperature increase, and therefore information is written.

In the thermally-assisted magnetic recording system, near-field light is generally used for supplying heat to a magnetic disk. Accordingly, a magnetic recording head of the thermally-assisted magnetic recording system (a thermally-assisted magnetic recording head) includes a light source generating laser light, a waveguide allowing the laser light to propagate therethrough, a plasmon generator generating the near-field light, and a magnetic pole generating recording magnetic field. The plasmon generator is disposed between the waveguide and the magnetic pole. When surface plasmons are generated by the plasmon generator, the surface plasmons are used to generate the near-field light in the vicinity of the air-bearing surface in the thermally-assisted magnetic recording head, and thus heat is supplied to the magnetic disk.

In the case where the near-field light is used, in Japanese Patent No. 4104584 specification, surface plasmon polariton coupling is used in order to prevent overheat of the plasmon generator due to direct irradiation of light. In this case, the light propagating through the waveguide (guided light) is not directly applied to the plasmon generator, and the guided light is coupled to the plasmon generator through evanescent coupling. As a result, surface plasmon polaritons are generated on a surface of the plasmon generator.

In the case of using the surface plasmon polaritons, in U.S. Pat. No. 8,400,885 specification, a spot diameter of the near-field light is made small and the shape of a tip surface of the plasmon generator is formed into a rectangle in order to make the gradient of light intensity steep. In this case, since light is collected to the vicinity of the tip surface of the plasmon generator, intensity of the light is increased.

When light absorption amount of the plasmon generator is increased in response to increase in the light intensity, the plasmon generator generates heat (is thermally expanded), and thus easily protrudes toward the magnetic recording medium. In this case, a distance between the plasmon generator and the magnetic recording medium is shorter than an appropriate value, which may cause unintentional collision between the plasmon generator and the magnetic recording medium. If the plasmon generator and the magnetic recording medium collide with each other, the plasmon generator is deformed or broken, which results in degradation in generating capacity of the near-field light. Accordingly, recording property is degraded.

Therefore, is it desirable to provide a technology capable of obtaining excellent recording performance.

SUMMARY OF THE INVENTION

A thermally-assisted magnetic recording head according to an embodiment of the present invention includes: a waveguide; a plasmon generator; and a light-absorbing protrusion layer provided on a leading side of the plasmon generator. A ratio W1/W2 is within a range from 2/3 to 55/3, where W1 is a width of the light-absorbing protrusion layer in an air-bearing surface, and W2 is a width of the waveguide in the air-bearing surface.

A head gimbals assembly, a head arm assembly, and a magnetic recording unit according to respective embodiments of the present invention are each provided with the above-described thermally-assisted magnetic recording head.

In this example, the light-absorbing protrusion layer is a layer that absorbs part of light guided by the waveguide and protrudes toward the magnetic recording medium with use of heat (thermal expansion) generated at the time of light absorption.

In the thermally-assisted magnetic recording head, the head gimbals assembly, the head arm assembly, and the magnetic recording unit according to the respective embodiments of the invention, the light-absorbing protrusion layer is provided on the leading side of the plasmon generator, and the above-described ratio W1/W2 is within the range from 2/3 to 55/3. In this case, at the time of writing, since the light-absorbing protrusion layer protrudes sufficiently with respect to the plasmon generator, contact probability between the plasmon generator and the magnetic recording medium is decreased. Accordingly, generating capacity of the near-field light by the plasmon generator is ensured, which makes it possible to obtain excellent recording performance.

DETAILED DESCRIPTION OF THE PREFERRED EMBODIMENTS

Hereinafter, an embodiment of the invention will be described in the following order with reference to drawings.
1. Configuration of magnetic recording unit
2. Structure of magnetic read write head 1
3. Structure of magnetic read write head 2
4. Structure of light source unit
5. Circuit configuration and operation of magnetic recording unit
6. Generation principle of near-field light and recording principle of thermally-assisted magnetic recording system
7. Function and effects
8. Examples

1. Configuration of Magnetic Recording Unit

Figure 1:
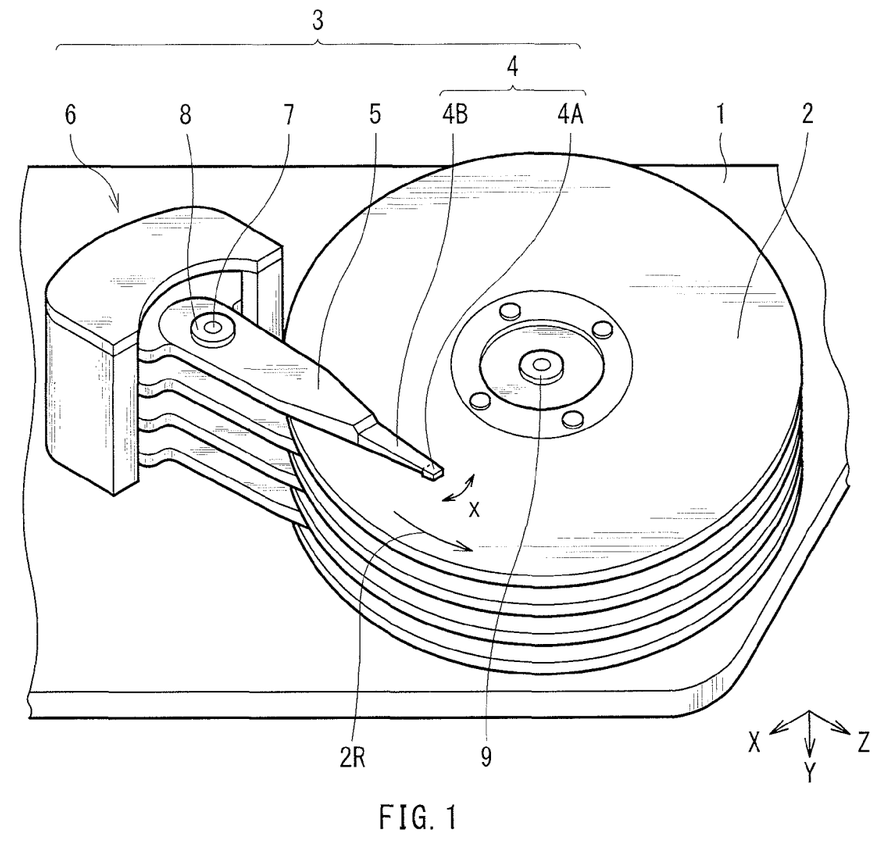
FIG. 1 is a perspective view illustrating a configuration of a magnetic recording unit using a thermally-assisted magnetic recording head according to an embodiment of the invention.
Figure 2:
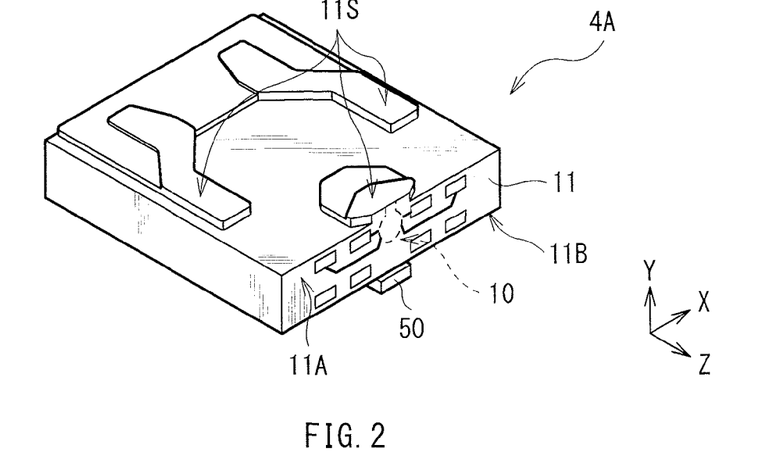
FIG. 2 is a perspective view illustrating a magnetic head slider illustrated in FIG. 1 in an enlarged manner.

First, referring to FIG. 1 and FIG. 2, a configuration of a magnetic recording unit using a thermally-assisted magnetic recording head according to an embodiment of the invention will be described. FIG. 1 is a perspective view illustrating the magnetic recording unit, and FIG. 2 is a perspective view illustrating a magnetic head slider 4A as illustrated in FIG. 1 in an enlarged manner.

The magnetic recording unit described here adopts, for example, a load-unload system as a driving system. The magnetic recording unit includes, for example, in a housing 1, one or more magnetic disks 2 in which information is to be written, a Head Arm Assembly (HAA) 3 for performing a write process and a read process of the information, and a control circuit for operation control (not illustrated) as illustrated in FIG. 1. Note that FIG. 1 exemplifies a case where four magnetic disks 2 are used, for example.

The HAA 3 includes a Head Gimbals Assembly (HGA) 4, an arm 5 supporting the HGA 4, and a driver 6 allowing the arm 5 to pivot.

The HGA 4 includes a magnetic head slider 4A having a side surface provided with a magnetic read write head 10 described later, and a suspension 4B having an end (a first end) provided with the magnetic head slider 4A. The other end (a second end) of the suspension 4B, namely, an end opposite to the end (the end) provided with the magnetic head slider 4A is supported by an arm 5. The arm 5 is pivotable, through a bearing 8, around a fixed shaft 7 fixed to the housing 1. The driver 6 as a power source may include, for example, a voice coil motor.

The magnetic head sliders 4A are disposed corresponding to recording surfaces (a front surface and a back surface) of the respective magnetic disks 2. Each of the magnetic head sliders 4A is movable in a direction across write tracks, that is, in a track width direction (in an X-axis direction) in a plane parallel to the recording surfaces of each of the magnetic disks 2. On the other hand, the magnetic disk 2 is rotatable around a spindle motor 9 fixed to the housing 1 in a direction (a rotation direction 2R) substantially orthogonal to the X-axis direction. At the time of writing, the magnetic disk 2 rotates and the magnetic head slider 4A moves over the recording surface of the magnetic disk 2. Therefore, information is written into the magnetic disk 2 as well as information stored in the magnetic disk 2 is read out.

The control circuit controls write operation and read operation of the magnetic read write head 10. The control circuit also controls light emission operation of a light source (a laser diode) for thermally-assisted magnetic recording described later.

For example, as illustrated in FIG. 2, the magnetic head slider 4A has a block-shaped slider 11 that may be formed of, for example, AlTiC ($Al_2O_3$.TiC). The slider 11 may be substantially formed as a hexahedron, for example, and one of six surfaces thereof corresponds to an air-bearing surface (ABS) 11S that faces the recording surface of the magnetic disk 2.

When the magnetic disk 2 does not rotate while the magnetic recording unit is stopped, the magnetic head slider 4A is pulled off to the position away from the recording surface of the magnetic disk 2 (unload state), in order to prevent contact of the ABS 11S and the recording surface. In contrast, when the magnetic disk 2 rotates while the magnetic recording unit is operated, the arm 5 is pivotably moved by the driver 6, and therefore, the magnetic head slider 4A moves above the recording surface of the magnetic disk 2 (load state). In this case, since the rotation of the magnetic disk 2 causes air flow between the recording surface and the ABS 11S, the magnetic head slider 4A floats with a certain distance (magnetic spacing) from the magnetic disk 2 with use of lift force caused by the air flow.

The magnetic read write head 10 is provided on a side surface (an element forming surface 11A) that is orthogonal to the ABS 11S of the magnetic head slider 4A. Incidentally, on a surface 11B opposite to the ABS 11S of the slider 11, a light source unit 50 is provided corresponding to the position of the magnetic read write head 10.

2. Structure of Magnetic Read Write Head 1

Next, the structure of the magnetic read write head 10 using the thermally-assisted magnetic recording head according to the embodiment of the invention is described with reference to FIG. 3 to FIG. 6. Incidentally, FIG. 3 also illustrates the light source unit 50 that is used together with the magnetic read write head 10 at the time of writing.

Figure 3:
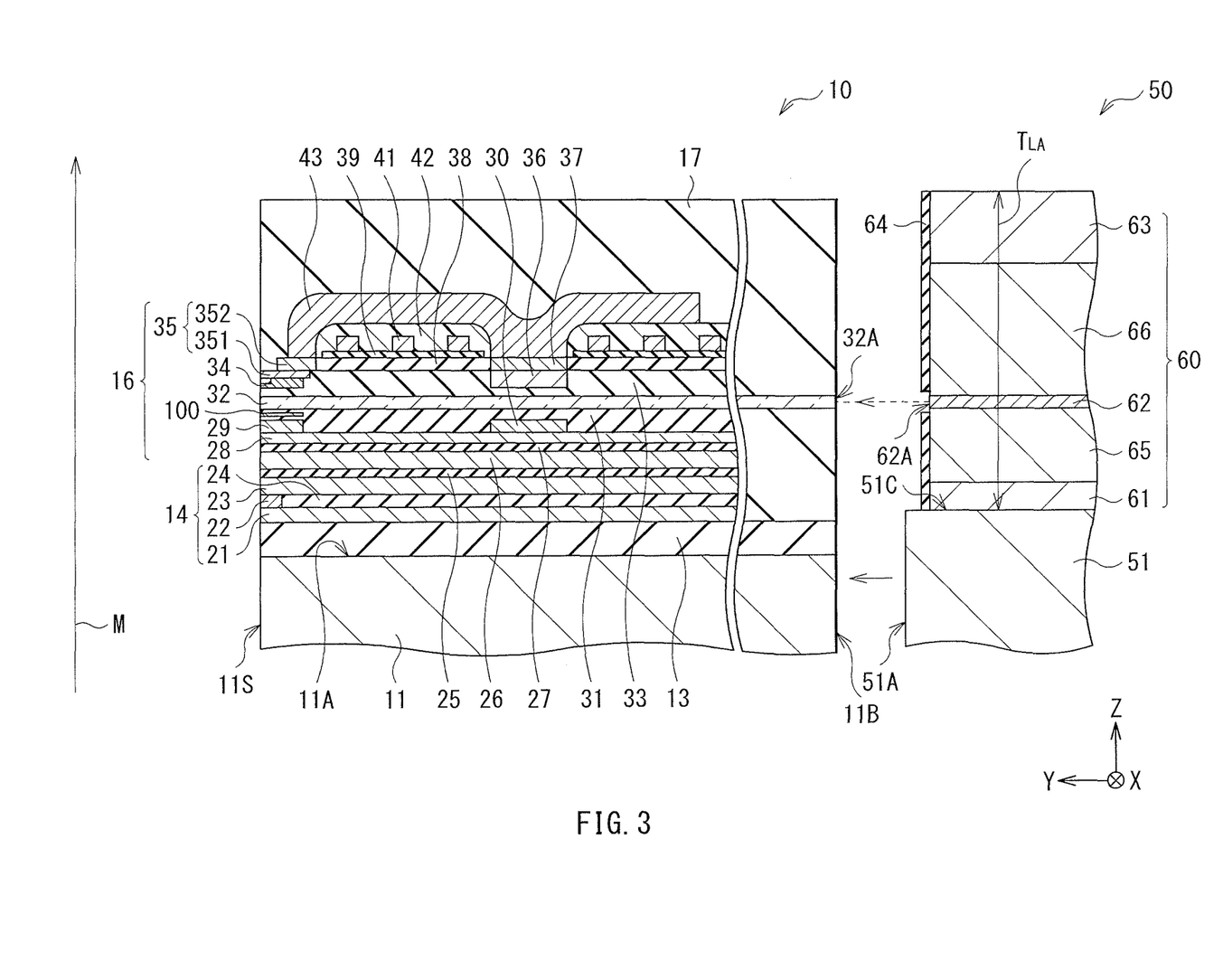
FIG. 3 is a sectional view of an YZ plane of a magnetic read write head using the thermally-assisted magnetic recording head according to the embodiment of the invention.
Figure 4:
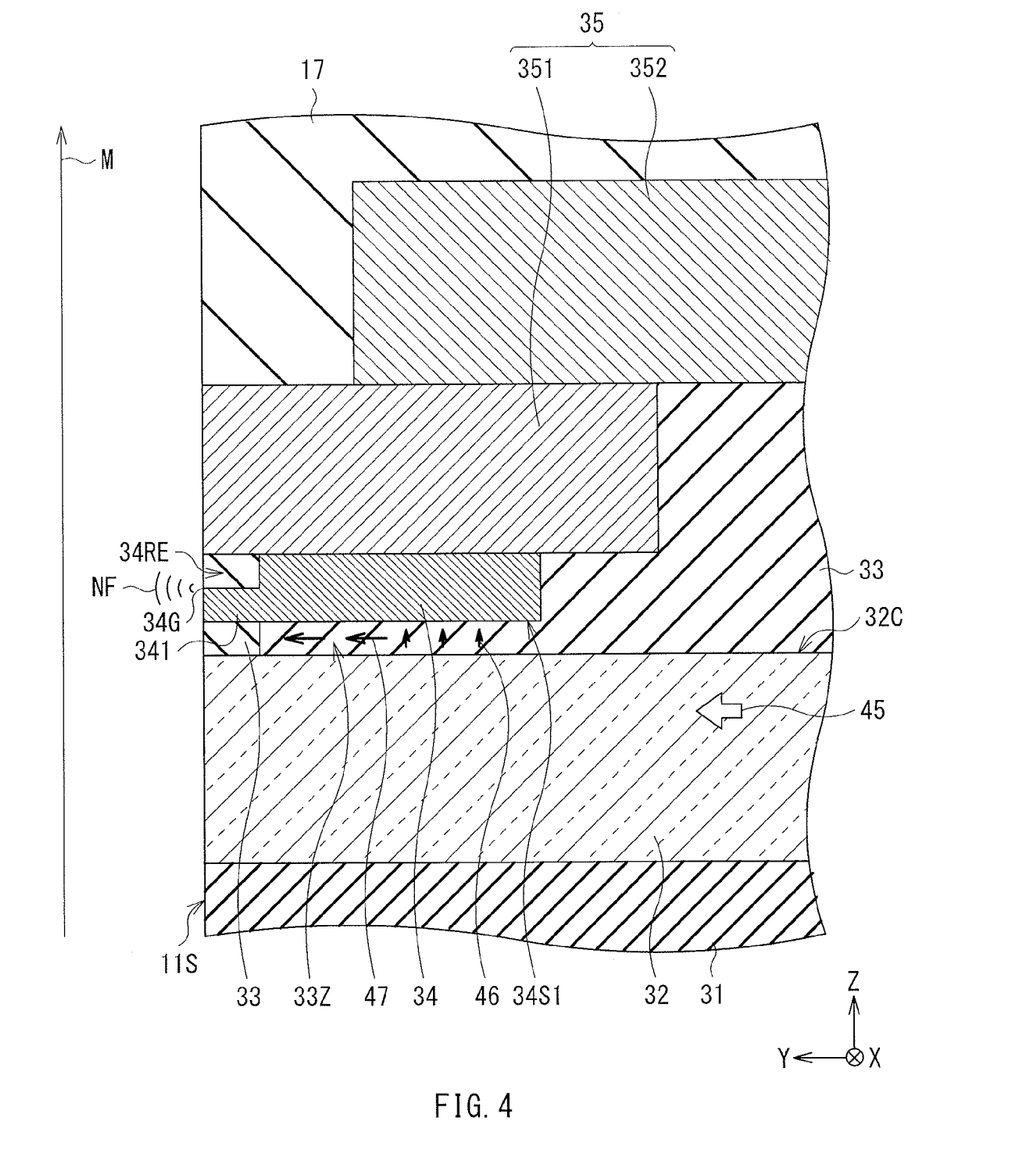
FIG. 4 is a sectional view illustrating a part of the magnetic read write head illustrated in FIG. 3 in an enlarged manner.
Figure 5:
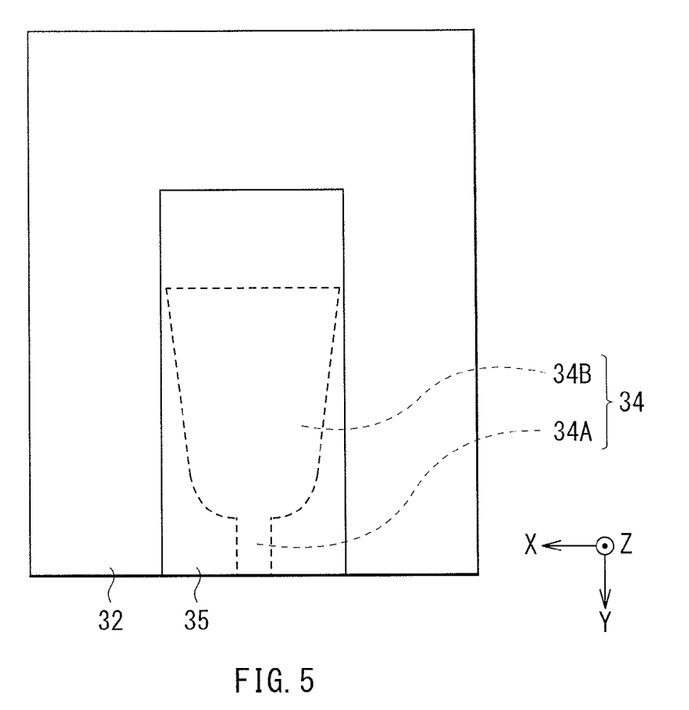
FIG. 5 is a plan view illustrating a structure of a main part of the thermally-assisted magnetic recording head.
Figure 6:
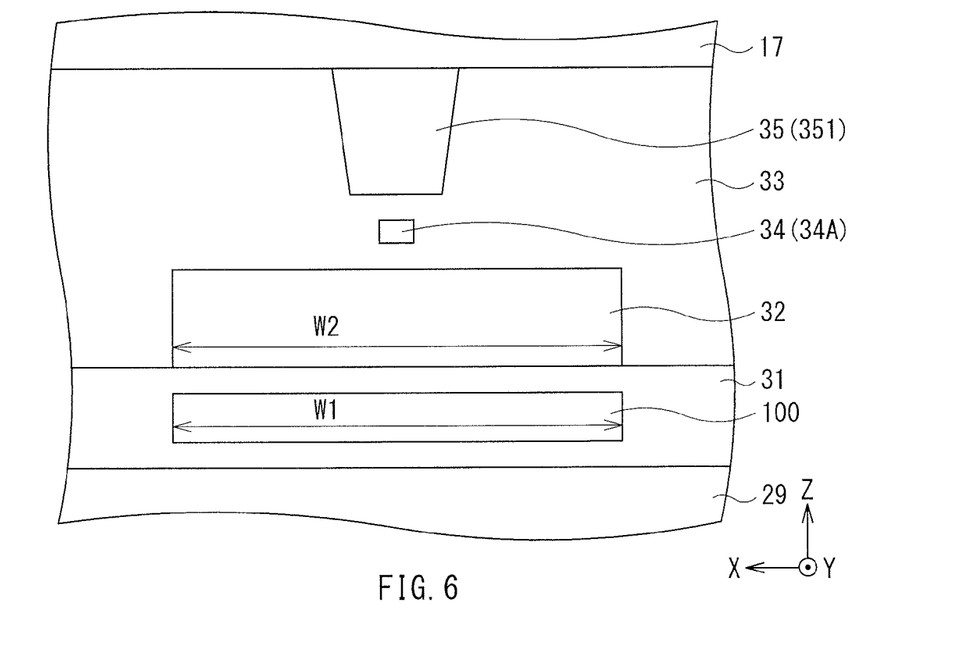
FIG. 6 is a plan view illustrating a structure of the magnetic read write head on an air-bearing surface.

FIG. 3 illustrates a cross-sectional structure on the YZ plane of the magnetic read write head 10 illustrated in FIG. 2. FIG. 4 illustrates a part of the magnetic read write head 10 illustrated in FIG. 3 in an enlarged manner. FIG. 5 illustrates a planar structure of a main part of the magnetic read write head 10 as viewed from a Z direction. FIG. 6 illustrates a planner structure of the magnetic read write head 10 on the ABS 11S. Note that an up-arrow M illustrated in FIG. 3 and FIG. 4 indicates a direction in which the magnetic disk 2 moves relative to the magnetic read write head 10.

The definition related to dimensions, directions, and the like are as follows. Dimensions in the X-axis direction, the Y-axis direction, and the Z-axis direction are referred to as a "width", a "height" or a "length", and a "thickness", respectively. A closer side to the ABS 11S in the Y-axis direction is referred to as "forward" and a farther side from the ABS 11S is referred to as "backward". Front and rear in the direction of the arrow M are referred to as a "trailing side" and a "leading side", respectively. The X-axis direction and the Y-axis direction are referred to as a "cross track direction" and a "down track direction", respectively.

The magnetic read write head 10 described here is a magnetic head performing magnetic processing on the magnetic disk 2 (see FIG. 1), and is a composite head capable of performing both of a writing process and a reading process, for example.

As illustrated in FIG. 3 to FIG. 6, for example, the magnetic read write head 10 is formed on the slider 11, and has the ABS 11S. More specifically, the magnetic read write head 10 has a structure in which an insulating layer 13, a read head section 14, an insulating layer 25, an intermediate shield layer 26, an insulating layer 27, a write head section 16, and a protective layer 17 are stacked in this order. Note that the light source unit 50 is disposed at backward of the magnetic read write head 10.

The read head section 14 uses magneto-resistive effect (MR) to perform a reading process. For example, the read head section 14 has a structure in which a lower read shield layer 21, a shield gap layer 24, and an upper read shield layer 23 are stacked in this order. A read element (an MR element 22) is embedded in the shield gap layer 24 so that one end surface of the read element is exposed on the ABS 11S.

Each of the lower read shield layer 21 and the upper read shield layer 23 extends backward from the ABS 11S, and is formed of, for example, a magnetic material such as nickel iron alloy (NiFe). Examples of the nickel iron alloy include Permalloy ($Ni_{80}Fe_{20}$: trade name) containing nickel of 80 wt % and iron of 20 wt %.

The shield gap layer 24 is formed of, for example, one or more kinds of insulating materials such as aluminum oxide ($Al_2O_3$), aluminum nitride (AlN), silicon oxide ($SiO_x$), and Diamond-Like Carbon (DLC).

The MR element 22 uses giant magneto-resistive effect (GMR), tunneling magneto-resistive effect (TMR), or the like to perform the reading process.

Each of the insulating layers 25 and 27 is formed of, for example, a similar material to that of the shield gap layer 24. The intermediate shield layer 26 prevents magnetic field generated in the write head section 16 from reaching the MR element 22. The intermediate shield layer 26 is formed of, for example, a magnetic material such as nickel iron alloy.

The write head section 16 is a thermally-assisted magnetic write head performing a write process of thermally-assisted magnetic recording system. For example, the write head section 16 has a structure in which a lower yoke layer 28, a return magnetic pole 29 and a connecting layer 30, a cladding layer 31 and an insertion layer 100, the waveguide 32, a cladding layer 33, a plasmon generator (PG) 34 and a connecting layer 36, the magnetic pole 35, a connecting layer 37 and an insulating layer 38, insulating layers 39 and 42 and a coil 41, and an upper yoke layer 43 are stacked in this order.

The lower yoke layer 28 extends backward from the ABS 11S, and is formed of, for example, a magnetic material such as nickel iron alloy.

The return magnetic pole 29 is disposed on a leading side of the PG 34, and takes in a magnetic flux released from the magnetic pole 35. The return magnetic pole 29 is disposed in the vicinity of the ABS 11S, and has one end surface exposed on the ABS 11S. The connecting layer 30 is disposed at backward of the ABS 11S so as to be distanced from the return magnetic pole 29. The return magnetic pole 29 and the connecting layer 30 are each formed of, for example, a magnetic material such as nickel iron alloy.

The cladding layer 31 is formed of a dielectric material having a refractive index to laser light smaller than that of the waveguide 32. The dielectric material is formed of a material essentially containing one or two or more kinds of, for example, silicon oxide ($SiO_x$), aluminum oxide ($Al_2O_3$), aluminum nitride (AlN), beryllium oxide (BeO), silicon carbide (SiC), and DLC. "A material essentially containing" means a material containing the above-described materials as main components, and the same applies to the following description.

The insertion layer 100 is a light-absorbing protrusion layer that absorbs part of the light (laser light) guided by the waveguide 32, and uses heat generation (thermal expansion) at the time of light absorption to protrude toward the magnetic disk 2. The insertion layer 100 is disposed on the leading side of the PG 34, and for example, is embedded in the cladding layer 31 so that one end surface thereof is exposed on the ABS 11S. In other words, for example, the insertion layer 100 is disposed (inserted) between the return magnetic pole 29 and the PG 34, more specifically between the return magnetic pole 29 and the waveguide 32, and is distanced from the return magnetic pole 29, the waveguide 32, and the PG 34. As is obvious from the fact that the write head section 16 has the insertion layer 100 besides the return magnetic pole 29, the light-absorbing protrusion layer (the insertion layer 100) described here is a component separately from the return magnetic pole 29.

Note that the one end surface of the insertion layer 100 on the ABS 11S has a width W1. The shape of the one end surface is, for example, a rectangle. However, the shape of the one end surface may be a shape other than the rectangle. Non-limitation of the shape in this way is also applied to the cross-sectional shape parallel to the ABS 11S.

The waveguide 32 extends backward from the ABS 11S, and allows laser light emitted from an LD 60 described later to propagate to the ABS 11S. For example, one end surface of the waveguide 32 is exposed on the ABS 11S at the forward thereof, and the other end surface is exposed at backward thereof. Note that the forward end surface of the waveguide 32 may be located at a position receded from the ABS 11S without being exposed on the ABS 11S.

The waveguide 32 is formed of a dielectric material allowing laser light to pass therethrough. The dielectric material is a material essentially containing one or more kinds of, for example, silicon oxide (SiC), DLC, titanium oxide ($TiO_x$), tantalum oxide ($TaO_x$), silicon nitride ($SiN_x$), silicon oxynitride ($SiO_xN_y$), silicon (Si), zinc selenide (ZnSe), niobium oxide ($NbO_x$), gallium phosphide (GaP), zinc sulfide (ZnS), zinc telluride (ZnTe), chromium oxide ($CrO_x$), iron oxide ($FeO_x$), copper oxide ($CuO_x$), strontium titanate ($SrTiO_x$), barium titanate ($BaTiO_x$), germanium (Ge), and diamond (C). The dielectric material may contain other materials having a refractive index higher than that of the cladding layer 31 and the cladding layer 33 as subcomponents (for example, impurity).

Incidentally, the one end surface of the waveguide 32 on the ABS 11S has a width W2 larger than the width of the PG 34 and the width of the magnetic pole 35, for example. The shape of the one end surface is, for example, a rectangle. However, the shape of the one end surface may be a shape other than the rectangle. Non-limitation of the shape in this way is also applied to the cross-sectional shape parallel to the ABS 11S.

At this time, the width W1 of the insertion layer 100 is optimized so that the insertion layer 100 uses the thermal expansion at the time of light absorption to be protrudable as described above. Specifically, a ratio W1/W2 between the width W1 of the insertion layer 100 on the ABS 11S and the width W2 of the waveguide 32 on the ABS 11S is within a range from 2/3 to 55/3. The reason why the ratio W1/W2 is within a predetermined range is as follows.

The insertion layer 100 is disposed on the leading side rather than the PG 34. Therefore, if a protrusion structure or the like that may contact with the magnetic read write head 10 is present on the surface of the magnetic disk 2, the insertion layer 100 reaches the protrusion structure or the like before the PG 34 reaches the protrusion structure or the like. In this case, when the ratio W1/W2 is within the above-described range, the insertion layer 100 protrudes sufficiently with respect to the PG 34, with use of thermal expansion. More specifically, when the ratio W1/W2 is smaller than 2/3, the light absorption amount of the insertion layer 100 is insufficient, and thus the insertion layer 100 does not sufficiently protrude. On the other hand, when the ratio W1/W2 is larger than 55/3, the thermal expansion of the insertion layer 100 is difficult to occur due to thermal diffusion, and thus the insertion layer 100 does not protrude sufficiently either. Accordingly, even if the magnetic read write head 10 comes in contact with the magnetic disk 2 at the time of writing, the insertion layer 100 comes in contact with the magnetic disk 2 instead of the PG 34, and thus contact probability between the PG 34 and the magnetic disk 2 is lowered. Therefore, degradation in generating capacity of the near-field light caused by deformation and breakage of the PG 34 is suppressed. Consequently, since the generating capacity of the near-field light is ensured, the recording performance is assured.

Specifically, the insertion layer 100 may preferably have a property of thermally expanding easily as compared with the PG 34. This is because the insertion layer 100 easily protrudes with use of the thermal expansion as compared with the PG 34, which makes it possible to obtain higher effect. Accordingly, the thermal expansion coefficient of the insertion layer 100 may be preferably equal to or larger than the thermal expansion coefficient of the PG 34. The thermal expansion coefficient described here is, for example, a linear expansion coefficient or the like.

In addition, the insertion layer 100 may preferably have a property of easily absorbing light as compared with the PG 34. This is because the insertion layer 100 is thermally expanded easily as compared with the PG 34, due to increase of the light absorption amount, which makes it possible to obtain higher effect. Accordingly, the absorption coefficient of the insertion layer 100 may be preferably equal to or higher than the absorption coefficient of the PG 34. The absorption coefficient described here is, for example, an absorption coefficient $\in 2$ or the like.

Incidentally, protrusion amount of the insertion layer 100 with use of the thermal expansion at the time of light absorption may strictly depend on not only the above-described thermal expansion coefficient but also a volume. Therefore, even when the thermal expansion coefficient of the insertion layer 100 is lower than the thermal expansion coefficient of the PG 34, the insertion layer 100 may protrude sufficient with respect to the PG 34 as long as the volume of the insertion layer 100 is sufficiently large. However, even if the volume of the insertion layer 100 is not sufficiently large, an advantage is obtainable in that the insertion layer 100 protrudes sufficiently with respect to the PG 34 as long as the thermal expansion coefficient of the insertion layer 100 is equal to or larger than the thermal expansion coefficient of the PG 34. This advantage is similarly obtainable in that the absorption coefficient of the insertion layer 100 is equal to or higher than the absorption coefficient of the PG 34.

The material of the insertion layer 100 is not particularly limited as long as the material is capable of allowing the insertion layer 100 to sufficiently protrude with use of the thermal expansion.

Specifically, for example, the insertion layer 100 may preferably contain, as a constituent element, one or more kinds of magnesium (Mg), aluminum (Al), chromium (Cr), iron (Fe), cobalt (Co), nickel (Ni), rhodium (Rh), palladium (Pd), indium (In), iridium (Ir), platinum (Pt), ruthenium (Ru), molybdenum (Mo), tungsten (W), and tantalum (Ta). This is because these elements each have high light absorption property.

Among them, one or more kinds of magnesium, aluminum, chromium, iron, cobalt, nickel, rhodium, palladium, indium, iridium, and platinum are particularly preferable. This is because these elements each have a high thermal expansion coefficient.

More specifically, the insertion layer 100 is formed of, for example, one or more kinds of the following materials. Examples of a single metal include magnesium, aluminum, chromium, iron, cobalt, nickel, rhodium, palladium, indium, iridium, platinum, ruthenium, molybdenum, tungsten, and tantalum. Examples of an alloy include iron cobalt alloy (FeCo).

The PG 34 generates near-field light NF in the vicinity of the ABS 11S with use of the laser light propagating through the waveguide 32. The PG 34 is disposed between the waveguide 32 and the magnetic pole 35, and extends backward from the ABS 11S. A recessed section 34RE is provided at an upper forward part of the PG 34 so that a part of the PG 34 is receded from the ABS 11S by a predetermined length, for example. Accordingly, the forward section of the PG 34 is surrounded by the cladding layer 33, and is distanced from the waveguide 32 and the magnetic pole 35 with the cladding layer 33 in between.

The PG 34 is formed of, for example, a conductive material such as a metal material. The metal material is one or more kinds of, for example, palladium (Pd), platinum (Pt), rhodium (Rh), iridium (Ir), ruthenium (Ru), gold (Au), silver (Ag), copper (Cu), and aluminum (Al). Among them, one or more kinds of gold, silver, copper, and aluminum are preferable.

Incidentally, the shape of the one end surface of the PG 34 on the ABS 11S is, for example, a rectangle. For example, the PG 34 has a width smaller than the width of the waveguide 32 and the width of the magnetic pole 35. However, the shape of the one end surface may be a shape other than the rectangle. Non-limitation of the shape in this way is also applied to the cross-sectional shape parallel to the ABS 11S.

For example, the PG 34 includes two regions (a front region 34A and a rear region 34B) having widths different from each other. The front region 34A is located on a side closer to the ABS 11S, and more specifically, for example, extends backward from the ABS 11S. For example, since the front region 34A has a uniform width, the planar surface shape of the front region is, for example, a rectangle. The rear region 34B is located on a side farther from the ABS 11S, and more specifically, for example, extends backward from the position receded from the ABS 11S and is coupled with the front region 34A.

Note that the front region 34A and the rear region 34B may be integrated or separated from each other. "Integrated" means a so-called one part because the front region 34A and the rear region 34B are formed in a single step. In contrast, "separated" means so-called two parts because the front region 34A and the rear region 34B are formed in different steps.

For example, the rear region 34B has a width larger than the width of the front region 34A, and the width of the rear region 34B is gradually increased backward from a forward end position of the rear region 34B. The planar shape of the rear region 34B is not particularly limited. Specifically, FIG. 5 illustrates a case where a side edge of the rear region 34B is a convex curve at forward side and is a straight line at the backward side; however, this is not limitative. For example, the side edge may be a straight line over all.

A backward end position defining an extending distance (length) of the front region 34A, namely, a coupling position of the front region 34A and the rear region 34B is not particularly limited as long as being located at backward of the ABS 11S.

The cladding layer 33 is provided between the waveguide 32 and the magnetic pole 35, and allows the PG 34 to be embedded therein. The cladding layer 33 is formed of, for example, a dielectric material similar to that of the cladding layer 31.

The magnetic pole 35 contains therein magnetic flux generated in the coil 41, and releases the magnetic flux from the ABS 11S to generate recording magnetic field. For example, the magnetic pole 35 has a structure in which a lower layer 351 and an upper layer 352 are stacked in this order. The lower layer 351 extends backward from the ABS 11S. The upper layer 352 extends backward from a position receded from the ABS 11S, for example, and a backward end of the upper layer 352 is located behind the backward end of the lower layer 351. Note that surroundings of the lower layer 351 are embedded by the cladding layer 33, for example.

The lower layer 351 and the upper layer 352 are each formed of, for example, a magnetic material with high saturation flux density such as iron-based alloy. The iron-based alloy is one or more kinds of, for example, iron cobalt alloy (FeCo), iron nickel alloy (FeNi), and iron cobalt nickel alloy (FeCoNi).

Incidentally, for example, a shape of one end surface of the lower layer 351 on the ABS 11S is a shape (an inverted trapezoid) in which a width of a trailing edge (an upper end) is larger than a width of a leading edge (a lower end). However, the shape of the one end surface may be a shape other than the inverted trapezoid. Non-limitation of the shape in this way is also applied to the cross-sectional shape parallel to the ABS 11S.

The connecting layer 36 is disposed at backward of the PG 34 and the magnetic pole 35, and is distanced from the PG 34 and the magnetic pole 35. The connecting layer 36 is located above the connecting layer 30 and surroundings thereof are embedded by the cladding layer 33. The connecting layer 37 is adjacent to an upper surface of the connecting layer 36, and is distanced from the magnetic pole 35 similarly to the connecting layer 36. The connecting layers 36 and 37 are each formed of, for example, a material similar to that of the connecting layer 30. The surroundings of the upper layer 352 and the connecting layer 37 are embedded by the insulating layer 38, for example.

The insulating layer 38 is formed of, for example, one or more kinds of insulating materials such as aluminum oxide ($Al_2O_3$), aluminum nitride (AlN), silicon oxide ($SiO_x$), and DLC.

The coil 41 generates recording-use magnetic flux in response to a write current. The coil 41 is disposed on the insulating layer 39, and is formed of, for example, one or more kinds of high conductive materials such as copper (Cu) and gold (Au). The coil 41 and the insulating layer 39 are covered with the insulating layer 42. The insulating layer 39 is formed of, for example, a material similar to that of the insulating layer 38. The insulating layer 42 is formed of, for example, one or more kinds of non-magnetic insulating materials showing fluidity during being heated, such as a photoresist and a Spin On Glass (SOG).

The upper yoke layer 43 extends backward from a position receded from the ABS 11S while covering the insulating layer 42, and is connected to the magnetic pole 35 (the upper layer 352) at the forward thereof and is connected to the connecting layer 37 at the backward thereof. The upper yoke layer 43 is formed of, for example, one or more kinds of soft magnetic materials with high saturation flux density such as cobalt iron alloy CoFe.

In the write head section 16, a magnetic path is formed mainly by the return magnetic pole 29, the lower yoke layer 28, the connecting layers 30, 36, and 37, the upper yoke layer 43, and the magnetic pole 35, and when a write current flows through the coil 41, magnetic flux is generated in the magnetic path. Accordingly, a recording magnetic field is generated in the vicinity of the ABS 11S in the magnetic pole 35.

The protective layer 17 covers the write head section 16, and is formed of, for example, a material similar to that of the cladding layer 31. Note that the protective layer 17 and the cladding layer 33 each have a lower refractive index and higher thermal conductivity compared with the waveguide 32. Accordingly, the waveguide 32, the PG 34, and the magnetic pole 35 are surrounded by dielectric materials (the protective layer 17 and the cladding layer 33).

3. Structure of Magnetic Read Write Head 2

Incidentally, the magnetic read write head 10 may have a structure described below.

Figure 7:
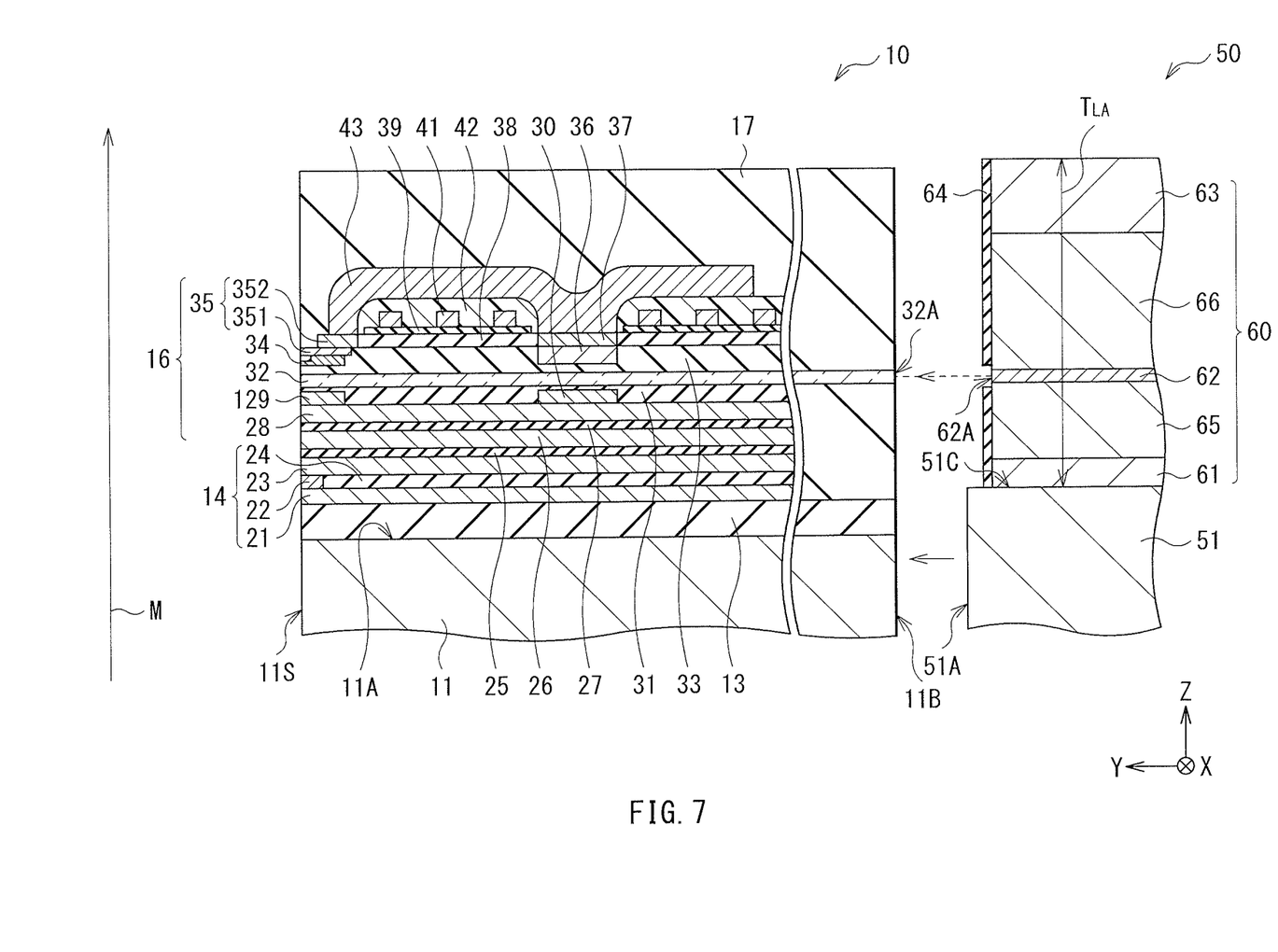
FIG. 7 is another sectional view of the YZ plane of the magnetic read write head using the thermally-assisted magnetic recording head according to the embodiment of the invention.
Figure 8:
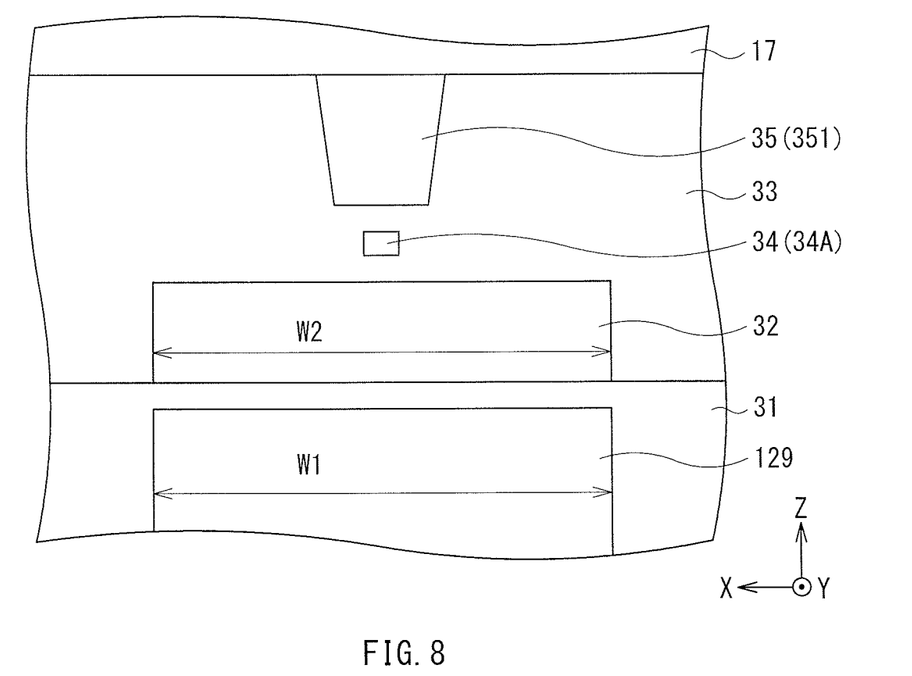
FIG. 8 is a plan view illustrating another structure of the magnetic read write head on the air-bearing surface.

FIG. 7 illustrates a cross-sectional structure of the magnetic read write head 10 corresponding to FIG. 3. FIG. 8 illustrates a planar structure of the magnetic read write head 10 corresponding to FIG. 6.

The magnetic read write head 10 described here does not include the insertion layer 100 and includes a return magnetic pole 129 in place of the return magnetic pole 29. In FIG. 3 and FIG. 6, the insertion layer 100 is provided separately from the return magnetic pole 29; however, the return magnetic pole 129 may double as the function of the insertion layer 100. In other words, in this case, the return magnetic pole 129 is the light-absorbing protrusion layer.

The material of the return magnetic pole 129 is similar to that of the insertion layer 100, and specifically, may be preferably a magnetic material. This is to facilitate taking in the magnetic flux in the return magnetic pole 29.

One end surface of the return magnetic pole 129 on the ABS 11S has the width W1. The shape of the one end surface is, for example, a rectangle. However, the shape of the one end surface may be a shape other than the rectangle. Non-limitation of the shape in this way is also applied to the cross-sectional shape parallel to the ABS 11S.

In this case, since the return magnetic pole 129 functions similarly to the insertion layer 100, relationship similar to relationship between the width W1 of the insertion layer 100 and the width W2 of the waveguide 32 is established between the width W1 of the return magnetic pole 129 and the width W2 of the waveguide 32. In other words, the ratio W1/W2 between the width W1 of the return magnetic pole 129 and the width W2 of the waveguide 32 is within a range of 2/3 to 55/3.

The reason why the ratio W1/W2 is within the predetermined range has been already described in detail, and thus the description is omitted.

The other structures of the magnetic read write head 10 are similar to those in the case described in "2. Structure of Magnetic Read Write Head 1" described above.

4. Structure of Light Source Unit

Next, the structure of the light source unit 50 will be described with reference to FIG. 3.

The light source unit 50 includes the Laser Diode (LD) 60 and a supporting member 51 supporting the LD 60.

The supporting member 51 is formed of, for example, a ceramic material such as AlTiC ($Al_2O_3$.TiC), and is a substantially rectangular parallelepiped. The supporting member 51 includes a bonded surface 51A to be bonded to a back surface 11B of the slider 11, and a light source mounting surface 51C that is orthogonal to the bonded surface 51A and is parallel to the element forming surface 11A. Note that the supporting member 51 desirably has a function of a heatsink dissipating heat generated by the LD 60, in addition to the function to support the LD 60.

The LD 60 is a light source emitting laser right, and is formed on the light source mounting surface 51C of the supporting member 51. A thickness $T_{LA}$ of the LD 60 is, for example, 60 μm to 200 μm both inclusive. Incidentally, series and intended use of the LD 60 are not particularly limited. For example, the series thereof may be of InP-based, GaAs-based, GaN-based, or the like, and the intended use thereof may be for communication, for optical disk storage, for material analysis, or the like. Although the wavelength of the laser light is not particularly limited, is for example, 375 nm to 1.7 μm both inclusive. The specific type of the LD 60 is, for example, a laser diode of InGaAsP/InP quaternary mixed crystal with the emission wavelength region of 1.2 to 1.67 μm both inclusive.

For example, the LD 60 has a structure in which a lower electrode 61, an n-type semiconductor layer 65, an active layer 62, a p-type semiconductor layer 66, and an upper electrode 63 are stacked in this order. The n-type semiconductor layer 65 includes, for example, n-type AlGaN, and the p-type semiconductor layer 66 includes, for example, p-type AlGaN.

On each of two cleavage surfaces of the stacked structure of the LD 60, a reflective layer 64 for exciting oscillation using light reflection is provided, and the reflective layer 64 is formed of one or more kinds of, for example, silicon oxide ($SiO_x$) or aluminum oxide ($Al_2O_3$). Incidentally, in the reflective layer 64, an opening for emitting laser light is provided at a position including an emission center 62A of the active layer 62.

The bonded surface 51A of the supporting member 51 and the back surface 11B of the slider 11 are bonded. In this case, the magnetic read write head 10 and the light source unit 50 are aligned in such a manner that the position of the emission center 62A and the position of the backward end surface 32A of the waveguide 32 are coincident with each other. Accordingly, when a predetermined voltage is applied between the lower electrode 61 and the upper electrode 63 and laser light is emitted from the emission center 62A of the active layer 62, the laser light enters the waveguide 32 through the backward end surface 32A.

Incidentally, the laser light emitted from the LD 60 may be preferably polarized light of a TM mode. The polarized light of the TM mode is polarized light whose electric field oscillates in a direction perpendicular to the surface of the active layer 62. A power source in the magnetic recording unit is allowed to be used to drive the LD 60, and the magnetic recording unit includes, for example, a power source capable of generating a voltage of about 5 V. The LD 60 consumes power of, for example, about several tens mW.

5. Circuit Configuration and Operation of Magnetic Recording Unit

Figure 9:
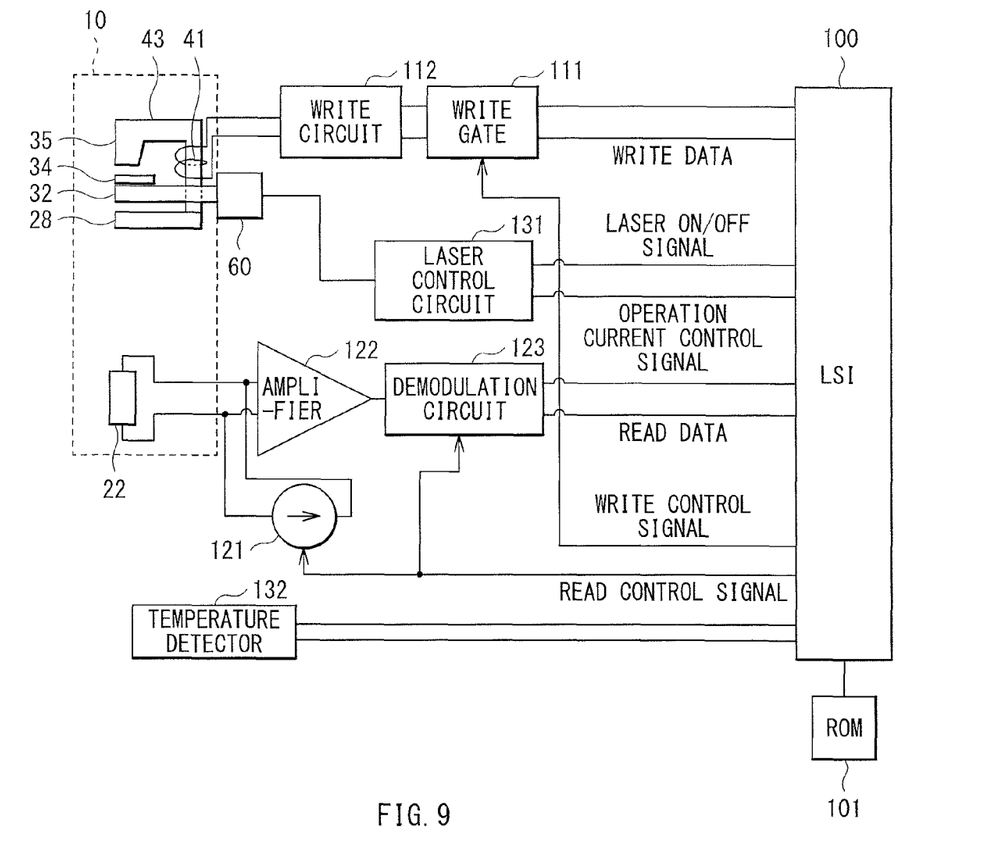
FIG. 9 is a block diagram illustrating a circuit configuration of a magnetic recording unit.

With reference to FIG. 4 and FIG. 9, the circuit configuration of the magnetic recording unit and the operation of the magnetic read write head 10 will be described below. FIG. 9 illustrates a circuit configuration of a control circuit of the magnetic recording unit illustrated in FIG. 1.

The control circuit of the magnetic recording unit includes a control LSI (large-scale integration) 100, a ROM (read only memory) 101 connected to the control LSI 100, a write gate 111 connected to the control LSI 100, a write circuit 112 connecting the write gate 111 to the coil 41, a constant current circuit 121 connected to the MR element 22 and the control LSI 100, an amplifier 122 connected to the MR element 22, a demodulation circuit 123 connected to the amplifier 122 and the control LSI 100, a laser control circuit 131 connected to the LD 60 and the control LSI 100, and a temperature detector 132 connected to the control LSI 100.

The control LSI 100 provides write data and a write control signal to the write gate 111. Moreover, the control LSI 100 transmits a read control signal to the constant current circuit 121 and the demodulation circuit 123, and receives read data from the demodulation circuit 123. In addition, the control LSI 100 transmits a laser ON/OFF signal and an operation current control signal to the laser control circuit 131.

The temperature detector 132 detects the temperature of the magnetic disk 2 to supply information of the temperature to the control LSI 100. The temperature of the magnetic disk 2 is the temperature of the magnetic recording layer having a recording region.

The ROM 101 holds information such as a control table to control an operation current to be supplied to the LD 60.

At the time of write operation, the control LSI 100 supplies the write data to the write gate 111. The write gate 111 supplies the write data to the write circuit 112 only when the write control signal instructs to perform the write operation. The write circuit 112 supplies the write current to the coil 41 according to the write data. As a result, a write magnetic field is generated from the magnetic pole 35, and information is recorded into the magnetic recording layer of the magnetic disk 2 by the write magnetic field.

At the time of read operation, the constant current circuit 121 supplies a constant sense current to the MR element 22 only when the read control signal instructs to perform the read operation. The output voltage of the MR element 22 is amplified by the amplifier 122, and is then received by the demodulation circuit 123. The demodulation circuit 123 demodulates the output of the amplifier 122 to generate read data and supplies the read data to the control LSI 100 when the read control signal instructs to perform the read operation.

The laser control circuit 131 controls the supply of the operation current to the LD 60 based on the laser ON/OFF signal, and controls the operation current to be supplied to the LD 60 based on the operation current control signal. The laser control circuit 131 supplies the operation current equal to or larger than an oscillation threshold to the LD 60 when the laser ON/OFF signal instructs to perform the ON operation. As a result, the laser light is emitted from the LD 60 and then the laser light propagates through the waveguide 32, and thus the near-field light NF is generated from a tip section 34G of the PG 34. A part (the recording region) of the magnetic recording layer of the magnetic disk 2 is heated by the near-field light NF, and thus the coercivity of the recording region is lowered. At the time of writing, information is recorded into the recording region with lowered coercivity by the recording magnetic field.

The control LSI 100 determines a value of the operation current of the LD 60 with reference to the control table stored in the ROM 101, based on the temperature of the magnetic disk 2 measured by the temperature detector 132 and the like. In addition, the control LSI 100 controls the laser control circuit 131 with use of the operation current control signal in such a manner that the desired operation current is supplied to the LD 60.

The control table includes, for example, data such as the oscillation threshold of the LD 60 and temperature dependency of light output-operation current property. Besides this, the control table may include data indicating a relationship between the operation current value and the increased amount of the temperature of the magnetic recording layer heated by the near-field light NF, data indicating temperature dependency of the coercivity of the magnetic recording layer, and the like.

The control circuit has a signal system to control the LD 60, that is, signals such as the laser ON/OFF signal and the operation current control signal, independent of the control signal system of write-read operation. Therefore, more various conduction modes to the LD 60 are achievable, in addition to the conduction mode simply operated in conjunction with the write operation.

Note that the circuit configuration of the control circuit of the magnetic recording unit is not limited to the circuit configuration illustrated in FIG. 9.

6. Generation Principle of Near-Field Light and Recording Principle of Thermally-Assisted Magnetic Recording System Subsequently, a generation principle of the near-field light NF and a recording principle of the thermally-assisted magnetic recording system with use of the near-field light NF will be described with reference to FIG. 1, FIG. 3, and FIG. 4.

When laser light 45 is emitted from the LD 60, the laser light 45 propagates through the waveguide 32 to reach near the PG 34. Accordingly, the laser light 45 is totally reflected by an interface (an evanescent light generating surface 32C) between the waveguide 32 and a buffer section 33Z of the cladding layer 33, and therefore evanescent light 46 is leaked into the inside of the buffer section 33Z. The "buffer section 33Z" is a section located between the waveguide 32 and the PG 34 in the cladding layer 33. Subsequently, the evanescent light 46 couples with charge fluctuation on a surface (a surface plasmon exciting surface 34S1) of the PG 34 facing the waveguide 32, to induce a surface plasmon polariton mode. As a result, surface plasmons 47 are excited on the surface plasmon exciting surface 34S1. The surface plasmons 47 propagate on the surface plasmon exciting surface 34S1 toward the ABS 11S.

The surface plasmons 47 eventually reach the ABS 11S, and as a result, the near-field light NF is generated on the tip section 34G of the PG 34. When being irradiated toward the magnetic disk 2, the near-field light NF heats a part (the recording region) of the magnetic recording layer, and therefore, the coercivity is lowered in the recording region. Since the write magnetic field generated by the magnetic pole 35 is applied to the recording region with the lowered coercivity, information is recorded in the recording region by the recording magnetic field.

7. Function and Effects

In the magnetic read write head 10, the insertion layer 100 that serves as the light-absorbing protrusion layer is disposed on the leading side of the PG 34, and the ratio W1/W2 between the width W1 of the insertion layer 100 on the ABS 11S and the width W2 of the waveguide 32 on the ABS 11S is within the range from 2/3 to 55/3. In this case, as described above, at the time of writing, the insertion layer 100 protrudes sufficiently with respect to the PG 34. Accordingly, even if a state where the magnetic read write head 10 comes in contact with the magnetic disk 2 occurs, the insertion layer 100 comes in contact with the magnetic disk 2 instead of the PG 34, which results in degradation in contact probability between the PG 34 and the magnetic disk 2. Consequently, generating capacity of the near-field light by the PG 34 is ensured, which makes it possible to obtain excellent recording performance.

Alternatively, in the magnetic read write head 10, the return magnetic pole 129 that serves as the light-absorbing protrusion layer is disposed on the leading side of the PG 35, and the ratio W1/W2 between the width W1 of the return magnetic pole 129 on the ABS 11S and the width W2 of the waveguide 32 on the ABS 11S is within the range from 2/3 to 55/3. In this case, since the return magnetic pole 129 functions as the above-described insertion layer 100, it is possible to obtain excellent recording performance due to the reason similar to that in the case of using the insertion layer 100.

In particular, when the thermal expansion coefficient of each of the insertion layer 100 and the return magnetic pole 129 is equal to or larger than the thermal expansion coefficient of the PG 34, it is possible to obtain higher effects.

Moreover, when each of the insertion layer 100 and the return magnetic pole 129 includes the above-described magnesium and the like as the constituent elements, it is possible to obtain higher effect.

8. Examples

Next, examples of the invention will be described in detail.

Correlation between the ratio W1/W2 and the recording performance (head lifetime: time) was examined with use of simulation in which the magnetic read write head 10 described in "3. Structure of Magnetic Read Write Head 2" described above was modeled, and thus a result illustrated in FIG. 10 was obtained.

Figure 10:
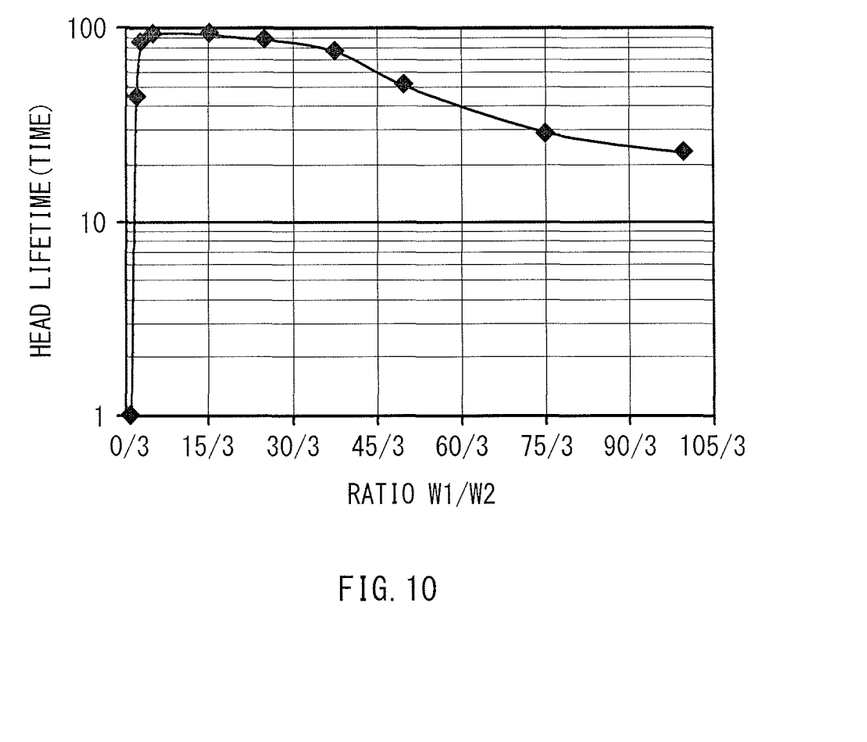
FIG. 10 is a diagram illustrating a result of simulation relating to correlation between a ratio W1/W2 and head lifetime.

In the simulation, the material of the cladding layers 31 and 33 was $SiO_2$, the material of the waveguide 32 was $TaO_x$, the material of the PG 34 was Au, and the material of the return magnetic pole 129 (the light-absorbing protrusion layer) was FeCo. In addition, the length of the PG 34 was 1 μm, the length of the return magnetic pole 129 was 0.25 μm, the width W2 of the waveguide 32 in the ABS 11S was 0.6 μm, and the wavelength of the laser light was 800 nm. In this case, the width W1 of the return magnetic pole 129 in the ABS 11S was changed to change the ratio W1/W2.

As is obvious from the result illustrated in FIG. 10, the head lifetime was drastically increased and was substantially constant, and then was gradually decreased as the ratio W1/W2 was increased. In this case, since the width W1 was within a range from 0.4 μm to 11 μm, when the ratio W1/W2 was within the range from 0.4/0.6 to 11/0.6 (=2/3 to 55/3), the head lifetime was substantially constant while maintaining a high value.

Accordingly, providing the light-absorbing protrusion layer (the return magnetic pole 129) on the leading side of the PG 34 and setting the ratio W1/W2 to 2/3 to 55/3 made it possible to obtain excellent recording performance.

Hereinbefore, although the invention has been described with reference to the embodiment, the invention is not limited to the above-described embodiment, and various modifications may be made. For example, the thermally-assisted magnetic recording head of the invention has been applied to a composite head; however may be applied to a write-only head not provided with a read head section.

Incidentally, the series of components of the thermally-assisted magnetic recording head of the invention, more specifically, the configurations (shapes, materials, positional relationships between components, etc.) of the waveguide, the plasmon generator, the magnetic pole, and the like are not limited to those described in the embodiment, and may be modified appropriately.

What is claimed is:

1. A thermally-assisted magnetic recording head, comprising:
    a waveguide;
    a plasmon generator; and
    a light-absorbing protrusion layer provided on a leading side of the plasmon generator,
    wherein a ratio W1/W2 is within a range from 2/3 to 55/3, where W1 is a width of the light-absorbing protrusion layer in an air-bearing surface, and W2 is a width of the waveguide in the air-bearing surface.

2. The thermally-assisted magnetic recording head according to claim 1, wherein the light-absorbing protrusion layer has a thermal expansion coefficient that is equal to or greater than a thermal expansion coefficient of the plasmon generator.

3. The thermally-assisted magnetic recording head according to claim 1, wherein the light-absorbing protrusion layer contains one or more elements selected from the group consisting of magnesium (Mg), aluminum (Al), chromium (Cr), iron (Fe), cobalt (Co), nickel (Ni), rhodium (Rh), palladium (Pd), indium (In), iridium (Ir), platinum (Pt), ruthenium (Ru), molybdenum (Mo), tungsten (W), and tantalum (Ta).

4. The thermally-assisted magnetic recording head according to claim 1, further comprising a magnetic pole,
    wherein the light-absorbing protrusion layer is a return magnetic pole configured to take in a magnetic flux released from the magnetic pole.

5. The thermally-assisted magnetic recording head according to claim 1, further comprising:
    a magnetic pole; and
    a return magnetic pole provided on the leading side of the plasmon generator, and configured to take in a magnetic flux released from the magnetic pole,
    wherein the light-absorbing protrusion layer is an insertion layer provided between the plasmon generator and the return magnetic pole.

6. A head gimbals assembly, comprising:
    a magnetic head slider having a side surface, the side surface including the thermally-assisted magnetic recording head according to claim 1; and
    a suspension having an end, the end being attached with the magnetic head slider.

7. A head arm assembly, comprising:
    a magnetic head slider having a side surface, the side surface including the thermally-assisted magnetic recording head according to claim 1;
    a suspension having a first end and a second end, the first end being attached with the magnetic head slider; and
    an arm supporting the suspension at the second end thereof.

8. A magnetic recording unit provided with a magnetic recording medium and a head arm assembly, the head arm assembly comprising:
    a magnetic head slider having a side surface, the side surface including the thermally-assisted magnetic recording head according to claim 1;
    a suspension having a first end and a second end, the first end being attached with the magnetic head slider; and
    an arm supporting the suspension at the second end thereof.

* * * * *